3,192,116
ANTI-TUMOR CLOSTRIDIUM COMPOSITION
Josef Richard Möse and Gisela Möse, both of Graz, Styria, Austria, assignors to Farbwerke Hoechst Aktiengesellschaft vormals Meister Lucius & Brüning, Frankfurt am Main, Germany, a corporation of Germany
No Drawing. Filed Apr. 17, 1962, Ser. No. 188,273
Claims priority, application Germany, Jan. 27, 1960, F 30,401
10 Claims. (Cl. 167—78)

This invention relates to compositions useful for the treatment of tumors due to malignant growth and methods of using such compositions in treating tumors. More particularly, it is concerned with compositions containing spores of apathogenic obligate anaerobes and the method of treating tumors with these compositions.

This is a continuation-in-part of our copending application Serial No. 19,198 filed April 1, 1960, now abandoned.

Attempts to treat tumors by bacterial infection or by treatment with bacterial products have been reported in the art. The treatment of animal tumors by administration to the animals of spores of *Clostridium histolyticum* has also been reported in the art. Since this microorganism is pathogenic and forms a toxin, the animals had to be protected by a simultaneous dose of antitoxin or of antibiotics to prevent a spreading of the infection. Further, it has been observed that healthy animals infected with tetanus spores do not become ill, but that tumor carrying animals died of tetanus infection after a short time and that the tetanus spores germinated in the tumor tissue but not in the normal tissue. However, all of the anaerobic spore-forming bacteria heretofore used for the treatment of tumors were pathogenic bacteria. Because of the pathogenic nature of these organisms, the attempts to control and treat tumors were unsuccessful. Accordingly, other methods of treating tumors have been sought which would not have the disadvantages of the previously used methods.

In accordance with this invention, it is now found that compositions comprising spores of non-pathogenic anaerobic strains of Clostridia in suitable physiological mediums are valuable agents for the treatment of tumors. These compositions can be administered parenterally, for example, intravenously, intra-arterially, intra-tumorally, intra-peri-tumorally or peri-tumorally for the treatment of tumors.

The non-pathogenic anaerobic strains of Clostridia suitable for the preparation of the spore containing compositions of this invention are those forming large quantities of spores which are non-pathogenic to the recipient even when given repeatedly in high doses. These included strains of such Clostridia that might be mentioned are *Clostridium acetobutylicum* (McClung 632) (MB–1282), *Clostridium tyrobutyricum* (McClung 1750) (MB–1280), *Clostridium tertium* (McClung 258) (MB–1281), *Clostridium felsenium* (MB–1301), *Clostridium pectinovorum* (MB–1386), (McClung 1188), and *Clostridium butyricum* (Strain 55, ATCC 13732) (MB–1341).

The microorganisms *Clostridium acetobutylicum*, *Clostridium tyrobutyricum* and *Clostridium tertium* are deposited in the culture collection of the University of Indiana where they are available under the McClung numbers indicated above.

The strain of *Clostridium butyricum* (ATCC 13732) was isolated from humus. It has the lab No. 55 and was deposited with the American Type Culture Collection, Washington, D.C., where it is incorporated into the collection as ATCC 13732. It was found to be particularly suitable for the treatment of tumors, this strain shows the following properties:

Motile rod-shaped obligate anaerobes $0.7 \times 5\mu$ (length in older cultures somewhat increased). Spores oval, subterminal, the rods swollen in a manner as is typical of Clostridium. Gram-positive (older cultures gram-variable). Good growth at 37° C. Gelatin is not liquefied. In liver and iron nail broth good growth and strong foaming. Negative to indole. Reaction towards sugar (+ acid formation, — no acid formation): Glucose+, galactose+, levulose+, saccharose+, lactose+, maltose+, starch+, inositol—, sorbitol—, arabinose—, xylose+, dulcitol—, rhamnose—, salicin+, mannitol+, (weak), amygdaline—, cellulose—, glycerine—. In view of these and other properties, strain 55 falls under the group of *Clostridium butyricum* (see Bergey: Manual of Determinative Bacteriology, 6th Edition, London, 1948, with an annex of the hitherto described types). According to Topley and Wilson: Principles of Bacteriology and Immunology, London, 1947, the corresponding synonyma are *Clost. pasteurianum*, *Bact. amylobacter*, *Granulobacter saccharobutyricum*.

The non-pathogenic anaerobic strains of Clostridia can be grown in media especially suitable for the production of spores such as blood agar plates iron nail broth, trypticase soy mediums, meat extract mediums, brain-heart-liver semisolid mediums and the like. When the desired degree of sporulation is reached, the spores are separated from the medium, washed with saline or water and the washed spores can be suitably suspended in sterile water or sterile saline for administration in accordance with this invention. Alternatively, the washed spores can be lyophilized and maintained in the dry state until needed.

In carrying out the culture of the Clostridia in preparing spores, the incubation of the microorganism is effected under anaerobic conditions. Thus, the inoculated mediums are allowed to grow in the presence of an inert atmosphere such as nitrogen or carbon dioxide. Alternatively, the desired anaerobic conditions can be achieved by including small amounts of reducing substances in the medium or by inoculating the culture medium with a suitable aerobic microorganism which will use up the oxygen in the culture vessel and thereby produce the desired anaerobic conditions.

The following examples illustrate methods of preparing suitable compositions containing the spores of non-pathogenic anaerobic Clostridia useful in the treatment of tumors.

EXAMPLE 1

Two drops each of a liquid culture of anaerobes (of 24 hours) of *Clostridium butyricum* ATCC 13732 are dropped on blood agar plates and are evenly spread by means of a spatula. Into the covers of these Petri dishes nutrient agar is poured on which a dense culture of *Bac. prodigiosum* is spread by means of a spatula. The blood plate is then put on the agar inoculated with *Bac. prodigiosum* and the borders of the Petri dishes are tightly sealed by casting with a hot mixture of petroleum jelly and of paraffin. Thereupon incubation takes place for 4 days at 37° C. In view of the rather intense and disagreeable odor of butyric acid, the plates are best opened in an isolated room. By means of a dyeing preparation, the sporulation (and for orientation also the purity) of the culture is determined. Each blood agar plate is then washed off with 2 to 3 milliliters of sterile physiological saline and transferred into little tubes. These are then washed 3 times with physiological saline followed by centrifugation for 10 minutes in a laboratory centrifuge running at full speed. Prior to pouring on fresh physiological saline, the deposit is suspended again and again by means of a sterile glass rod. After the last centrifugation sterile physiological saline is added once more until the desired number of spores is reached and this suspension is then filtered through sterile paper filters. The now evenly suspended preparation is placed for 25 minutes into a water bath of 73° C. The exact number of organisms is ascertained, the percentage of spores in the stained preparation is determined and the number of spores per milliliter of suspension is calculated therefrom. For control of purity anaerobic and normal (aerobic) broth tubes are inoculated with the suspension. The latter have to remain sterile during the incubation. The suspension is then filled into small tubes or, partly, into ampules (each time in small amounts of 0.5 to 1.0 milliliter) and frozen at $-25°$ C. until they are used. When defrosting at a later date the suspensions have to be shaken well.

EXAMPLE 2

An iron nail broth (K. Berger, Wiener Med. Wochenschrift 97, 381 (1947)) is inoculated with *Clostridium butyricum* ATCC 13732 and incubated at 37° C. (for 8 to 10 days) until the highest possible sporulation is attained. The broth culture is then filtered, washed once with physiological saline, filtered once more (paper filter) and washed twice. After pouring on an appropriate amount of fresh saline and well suspending the organisms by means of a glass rod, the suspension is allowed to stand over night in a normal refrigerator. On the next day a slight deposit that may have formed is discarded and the supernatant suspension is taken up by a syringe and mixed in a single text tube. In this test tube the suspension is subjected for 25 minutes to a temperature of 73° C. in the water bath. After germ counts and controls for purity have been performed, small portions of the suspensions are filled into little tubes and ampules. The spore suspensions thus prepared are frozen at $-25°$ C. until they are used. The advantage of the preparation in the iron nail broth consists in the fact that better sporulation results are obtained and that the growing culture can more easily be supervised.

EXAMPLE 3

A culture of *Clostridium butyricum* was developed for 24 hours on brain-heart-liver semisolid agar medium. 5–10 ml. of this culture will be transferred on 1.5 l. of a medium of the following composition:

| | Percent |
|---|---|
| Trypticase | 0.5 |
| Phytone | 0.3 |
| NaCl | 0.5 |
| Saccharose | 0.5 |
| L-lysin | 0.05 |
| Iron-nails, 10 pieces. | |

This medium was prepared in 2-l. flasks with cotton plugs. After inoculation as decribed above and cultivation at 37° C. the sporulation was complete in 10–14 days. The medium contained $5 \times 10^7$ spores/ml. by visual count.

EXAMPLE 4

A culture of *Clostridium butyricum* was incubated in Erlenmeyer flasks with 150 ml. medium of the following composition:

| | Percent |
|---|---|
| Trypticase | 2.0 |
| Meat-extract | 0.5 |
| Yeast-extract | 0.5 |
| NaCl | 0.25 | pH 7.0–7.2. After the inoculation the flask was flushed with nitrogen gas and cultivated 18 hours at 37° C.

A fermenter provided with air inlet tube, closable inoculation tube, sampler and pressure equalizing tube with cotton-wool filter was charged with 20 l. of a medium of the following composition:

| | Percent |
|---|---|
| Trypticase | 2.0 |
| Saccharose | 0.5 |
| L-lysin | 0.05 |
| NaCl | 0.25 |

After sterilization for 20 minutes at 120° C. the pH-value should have amounted to 7.0–7.2.

After cooling down to 37° C. the fermenter was flushed with nitrogen gas and inoculated with 300 ml. of a culture propagated described above. It followed a second flush with nitrogen gas. The sporulation was complete after 48–120 hours.

EXAMPLE 5

A culture of *Clostridium acetobutylicum* (L. S. Mc-Clung 632) (MB–1282) was developed by three serial transfers in Difco brain heart-liver semisolid agar medium. Each transfer incubated to complete sporulation (72 hr.) at 37° C. was preceded by a 3–5 min. heat-shock treatment at 100° C. Ten ml. of the third transfer were used while still in the vegetative form to inoculate 200 ml. per 250 ml. Erlenmeyer flask of medium A and medium B. After a 6-hour incubation under anaerobic conditions at 37° C. these media were used as inoculum for the final sporulation stage.

The two media used at this stage were as follows:

Medium A

| | Percent |
|---|---|
| Trypticase | 1.7 |
| Phytone | 0.3 |
| NaCl | 0.25 |
| $K_2HPO_4$ | 0.25 |
| Dextrose | 0.25 |

Medium B

| | Percent |
|---|---|
| Trypticase | 1.7 |
| Phytone | 0.3 |
| NaCl | 0.25 |
| $K_2HPO_4$ | 0.25 |
| Dextrose | 0.6 |
| Sodium thioglycolate | 0.05 |
| L-cystine | 0.025 |
| $Na_2SO_3$ | 0.01 |
| Yeast extract | 0.05 |
| $H_2O$ to 100%. | |

Medium A was prepared as 3 liters of medium in a 4-liter Erlenmeyer flask having a rubber stopper with appropriate vents. After inoculation with culture developed in Medium A the medium was flushed with nitrogen gas and the flask sealed.

Medium B was prepared in the same manner except that it was not flushed with nitrogen gas. Anaerobic conditions were maintained by means of the reducing substances present in the medium.

When sporulation was complete (48–72 hr.), Medium A contained $1.5 \times 10^8$ spores per ml. and Medium B contained $4.1 \times 10^8$ spores per ml. by visual count.

EXAMPLE 6

A well-sporulated culture of *Clostridium acetobutylicum* (L. S. McClung 632) (MB–1282) was heat-shocked for 5 minutes at 100° C. and transferred to a tube containing 15 cc. of freshly prepared brain heart-liver semisolid agar. After incubation at 37° C. for 72 hr., the culture was heat-shocked for 5 min. and 1 ml. used to inoculate a 250-ml. Erlenmeyer flask containing 200 ml. of trypticase soy medium (Medium A) shown in Example 3. This flask, having a rubber stopper and appropriate vents, was flushed with nitrogen gas and incubated at 37° C. for 18 hr. The entire 200 ml. was used to inoculate 3 liters of BBL trypticase soy medium contained in a 4-liter jug. The stoppered jug was flushed with nitrogen and incubated at 37° C. for 72 hr. At termination, this batch contained $1.3\times10^9$ spores per ml. by visual count.

A three liter bottle of broth labeled Batch C2, *Clostridium acetobutylicum* (MB–1282), containing $1.33\times10^9$ spores per ml. by microscopic count was centrifuged in sterile centrifuge bottles at a speed and time appropriate for the separation of solids and liquid. After centrifugation, the clear supernatant liquid was decanted and the sediment containing the spores was retained. The spores were then washed with sterile distilled water by suspending the spores in the water. The suspension was centrifuged in sterile centrifuge bottles and the supernatant was discarded. This washing procedure was repeated a second time.

Three hundred ml. of sterile distilled water was added to the crop of twice-washed spores. Thus, the spores were concentrated 10-fold, giving a calculated microscopic count of $1.33\times10^{10}$ spores per ml. Fifty previously sterilized 20-ml. vials plugged with cotton were filled aseptically with 1 ml. of spore concentrate per vial. The vials containing the spores were then heated at 80° C. for 10 min. in a water bath. The vials were placed in a desiccator and freeze-dried under vacuum for 24 hr. The cotton plugs were removed aseptically and replaced with sterile rubber stoppers.

Another group of dried spores of *C. acetobutylicum* (MB–1282) was prepared by adding 1 ml. of the spore concentrate and 0.2 ml. of a 500 mg./ml. solution of d-mannitol. The contents of the vials were then freeze-dried under vacuum for 20–24 hr. The cotton plugs in the vials were replaced with sterile rubber stoppers.

Both lots of ampuled freeze-dried spores were submitted to mouse assay and found to be active.

EXAMPLE 7

The procedure used was the same as Example 6 except that the culture was *Clostridium butyricum* and the production medium had the following ingredients:

| | Percent |
|---|---|
| Difco meat extract | 0.5 |
| Sheffield N-Z-Amine type E | 2.0 |
| Difco yeast extract | 0.05 |
| $H_2HPO_4$ | 0.125 |
| Sodium citrate | 0.5 |
| NaCl | 0.25 |
| $MgSO_4.7H_2O$ | 0.02 |
| $MnSO_4.H_2O$ | 0.005 |
| Deionized $H_2O$ to 100%. | |

At the completion of 5 days' incubation, a visual spore count of $0.6\times10^8$ was obtained.

The spores of the non-pathogenic, anaerobic Clostridia which can be prepared in accordance with the above examples, can be intimately dispersed in physiological carrier vehicles and used in the treatment of tumors in animals. The suspensions of the spores in suitable aqueous vehicles can be administered parenterally, particularly intra-arterially, intravenously, intra-tumorally, intra-peritumorally or peritumorally. After injection, the spores distribute with the blood stream in the organism. Normally, such spores do not germinate or only to such a small extent that the vegetative forms are destroyed at once by phagocytosis, and no spores are found after about 14 days. In tumors, however, an anaerobic medium exists so that the spores meet with favorable conditions for germination and propagation thereby effecting shrinkage of the tumor tissue.

The apathogenic strains of Clostridia used for the treatment of tumors do not cause any side effects. Thus, normal rabbits given an intravenous injection of 1 ml. of pure, undiluted spore suspension (about 500,000,000 spores) of *Clostridium butyricum* ATCC 13732 did not show any reaction apart from a short rise in the body temperature when spore suspensions prepared by means of blood agar plate cultures were applied. The rabbits were tested for several weeks and then were sacrificed and autopsied to determine if any damage had occurred. No pathologic changes were found in any of the animals.

In accordance with a further embodiment of this invention, it is found that in some cases it is desirable to add a pyrogenic substance to the spore suspension. Thus, the tumors can be treated with a spore suspension to which is added a physiologically tolerable dose of a bacterial endotoxin (bacterial pyrogen) such as a lipopolysaccharide obtained from gram-negative bacteria, killed gram-negative bacteria, or a culture filtrate of gram-negative bacteria. The bacterial endotoxin can be combined with the spores and the mixture lyophilized. The lyophilized mixture can be stored in the cold and reconstituted before using by the addition of a suitable physiological carrier vehicle such as sterile water or saline.

The activity of spore suspensions *Clostridium butyricum* strain 55 in the treatment of tumors in animals is described below:

(1) *Ehrlich ascites tumor*

0.3 milliliter of ascites fluid of a fresh ascites tumor was administered intraperitoneally to mice having an average weight of about 20 grams. On the 4th day of the test 0.2 milliliter of spore suspensions were injected corresponding to 18,000,000 spores. Additional tests were carried out by repeatedly injecting (with intervals of some days) intravenously varying quantities of spores from 250,000 to 18,000,000, each. After an injection all animals, except the controls, showed a stop or reduction of the increase in weight having been caused by the growth of the tumor. 24 hours after the spore injection there could already be found in the streak preparation a few and later more germinated rods in the ascites liquid but not such an abundant quantity as when treating solid tumors.

The action of a single spore injection proved to be most favorable when it coincides temporarily with the commencing growth impetus of the tumor (after the initial latency); this is the case on about the third day. Considerable increases in survival periods could partly be observed. Spore injections immediately after the tumor injections are of low effect, likewise injections given at a later date during the massive increase in weight due to the growth of the tumor.

(2) *Ehrlich tumor in solid form*

This tumor designated in the following as "solid-type tumor" was originally obtained by injecting subcutaneously a small quantity of a fresh ascites tumor into the left scapular region. After some time there developed at this place a slowly growing solid tumor of about hard rubber-like consistencey. For the further passages a rather sharply localized tumor was removed under sterile conditions, cut into small pieces by means of scissors and thereupon pulverized for a short time in a mortar with addition of a little physiological saline. This suspension still consisting of larger particles is taken up through a big cannula by tuberculin syringes and the animals are given subcutaneous injections of 0.05 milliliter each of the suspension through the left foreleg into the left scapular region.

The tumor growth was recorded by measuring the tumor size. Normally, about 10 days after the injection a small tumor nodule could distinctly be palpated which later on developed to a considerable size. After 3 to 4 weeks the tumor sizes of the control animals amounted up to 25 x 28 mm. (=height×width); in some cases they were even larger. The control animals died within about 30 to 40 days. The solid-type tumor has no tendency to metastasize. Even in its large form it is only tightly fixed to the skin covering it. It can relatively easily be separated from the surrounding tissue. Macroscopically recognizable necroses within the control tumors could not be observed.

In the first test series the intravenous injection of spores of strain 55 (in a quantity of about 18 millions of spores) was only given at a very late stage of tumor development. The tumor sizes amounted to 20 x 20 mm. It was found in all cases that already after a short time (1 to 2 days) after the single spore injection the tumor softened, liquefied and finally discharged non-hemorrhagic material of thinly purulent consistency through an opening being small at first and broadening later on. Its intense odor of butyric acid is identical with that of the strain in the culture medium. In the smear preparation there are only found the injected organisms in great number.

By this treatment the tumor is necrotized in its full size without the process extending to the surrounding tissue. According to the size of the original tumor and, therewith, according to the corresponding loss of tissue there forms a rather hard crust that can easily be removed. Regeneration processes partly set in at the edge. However, the larger the original tumor and the larger the loss of tissue, the less the animal can heal the loss of tissue which is sometimes extremely high as compared with the size of the animal. In this case the animals die some time later. If the test procedure is altered in such a way that the spore injection is not given in the later tumor stage but already when the tumor is of small or at most medium size, a high percentage of the animals can heal and survive this loss of tissue.

The conditions regarding small tumors are insofar different from the conditions prevailing in the case of large tumors, which in themselves are ready for decomposition, as in the first case the tumor does not decompose with such certainty already after 1 to 2 days upon administration of one or several spore injections. Mostly, several days elapse until decomposition sets in. When treating very small tumors which are just palpable as small solid nodules and which continued to grow in the control animals, decomposition also sets in without outward discharge. Healing proceeds in these cases without any changes becoming apparent.

In other tests the decomposition of the tumor was observed histologically. 24 hours after the spore injection vegetative forms of the organisms could already be detected in small up to abundant quantity. At this time massive necroses were already visible histologically. In the impression preparation of kidney, liver, spleen and heart blood no vegetative forms could be detected. 48 hours after the spore injection the majority of the tumors showed under microscopic examination marked lysis, partly with a small outward opening. Histological examination revealed extensive necroses of the type of coagulation necroses with small tumor cell islands which were already damaged. After 72 hours all tumors were also macroscopically found to be in lysis with a small or wider outward opening. The histological records confirm these findings. Even after this time no vegetative forms could be found in the organs.

In the culture the organisms can be cultivated again from the organs within a period of 14 days after the injection; at a later date this is no longer possible. These findings show that, although after intravenous injection the spores distribute in the whole organism, the germination only takes place in the tumor tissue. This fact seems to indicate that the special anaerobic conditions in the tumor tissue enable the germination and activation of the spores.

When the same test procedure was adopted but with smaller tumors, there was likewise observed a rapid settlement of the organisms in the tumor. Necrosis set in much more slowly than in large tumors. After healing, a high percentage of the animals survived. For comparison, animals bearing Ehrlich ascites tumors and Ehrlich solid-type tumors were treated, instead of with the anaerobic strain 55, with spore suspensions of aerobic spore formers, viz. *Bac. subtilis* and *Bac. mesentericum*. In this case the tumors were not influenced. In the tumor smear no vegetative forms could be detected.

(3) *Tests on other tumors*

In further test series animals bearing Walker tumors, Yoshida sarcomas and Oberling tumors were treated with spore suspensions of strain 55. Some days after the spore injection a softening and necrosis of the tumors could likewise be observed. A great number of rod-shaped bacteriae of strain 55 could be detected in the tumors. In other test series animals bearing induced methylcholanthrene fibro-sarcoma were treated with one intravenous injection of 100 ml. spores. 8 days after the treatment the average weight of tumors was 2.40 grams, that of the control tumors 6.08 grams. In other test series mice bearing spontaneous tumors (ca. of mamma) had been treated with 100 ml. spores intravenously, the average tumor weight of the treated animals was 1.4 grams, that of the controls 9.4 grams. The strong necrosis accompanied by secondary infections prevented a marked prolongation of the survival period. Similar conditions prevailed when treating melanomas in the mouse. The tumor mass likewise liquefied but the melanoma did then dry up and fall off so that genuine healings could be observed.

It was found that in some cases, particularly in the initial stage of the tumor growth, the spores germinate poorly in the tumor tissue. Germination can be promoted by applying a bacterial pyrogen either prior to the administration of the spores or simultaneously therewith. This measure produces localized necroses in the tumors (cf. M. J. Shear et al., J. Nat. Cancer Inst. 4, 81, 99, 107, 123 (1943); 5, 159 (1949); Approaches to Tumor Chemotherapy 1947, 236). In these necrotic places the bacterial spores obviously find a particularly favorable medium for germination and can thus effect a shrinkage and healing of the tumor.

It was already mentioned that the spore preparations obtained from the blood agar plate culture often contain small amounts of pyrogenic substances, thus promoting the germination of the spores. The spore suspensions obtained from an iron nail broth are free from pyrogen when working carefully. When a combined treatment with pyrogen is desirable and when applying the pyrogen-free spore suspension the tumor is previously treated with a bacterial endotoxin or the latter is simultaneously given in admixture with the spore suspension. This kind of pyrogen pre-treatment shows the advantage as compared with the application of the pyrogen-containing spore suspension obtained from a blood agar culture medium that the pyrogen can exactly be dosed and that the dose of the spore suspension can be chosen as desired. As bacterial endotoxins there come into consideration such from gram-negative bacteriae, for example *E. coli, Salmonella, Shigella, Pasteurella, Serratia,* etc. Instead of pure endotoxins there may also be used culture filtrates or killed bacteriae.

The lytic effect of spores of *Clostridium acetobutylicum, Clostridium tyrobutyricum, Clostridium tertium* and *Clostridium felsenium* on sarcoma 180 in mice was demonstrated experimentally as follows: Groups of 12 mice bearing a tumor of sarcoma 180 of approximately 2.0 sq. mm. in area were given intravenously once a suspension of the spores in saline solution and 8 days after the injection the average weight of the tumors in the control and treated groups of mice was determined. The results are shown in the following table.

| Treatment | Spores given i.v., based on viable count | Average tumor weights (grams) |
|---|---|---|
| Saline Controls | | 2.6 |
| Cl. acetobutylicum | 30×10⁶ | 1.3 |
| Cl. acetobutylicum (heated) | 20×10⁶ | 1.3 |
| Cl. tyrobutyricum | 14×10⁶ | 2.0 |
| Cl. tyrobutyricum (heated) | 14×10⁶ | 1.3 |
| Cl. tertium | 20×10⁷ | 1.6 |
| Cl. tertium (heated) | 60×10⁶ | 1.0 |
| Cl. felsenium | 40×10⁶ | 1.7 |
| Cl. felsenium (heated) | 40×10⁶ | 1.9 |

The spores used in the foregoing test were prepared by growing the Clostridia in trypticase soy medium by the procedures described in Example 6. The heated spores used in the tests were prepared by heating 4 mg. of the dried spores at 80° C. for 30 minutes in a water bath.

Each of the groups of mice treated with the spores of Clostridia showed good lysis of tumors with spores, bacilli and sporangi present in the tumor spores. As is shown in the above table, there was a statistically significance (95% limit) in the weight of the tumor tissue in the groups of mice treated with the spores over the saline control group.

A similar test, as described on page 17, was carried out with spores of Cl. butyricum ATCC 13732 prepared by growing the organism in a trypticase soy medium by the procedures described in Example 6. The results of this test with two separate batches of spores at different levels are shown in the following table:

| Treatment | Spores given i.v., based on viable count | Average tumor weights in grams after— | |
|---|---|---|---|
| | | 10 days | 13 days |
| Cl. butyricum C-54 | 69×10⁶ | 3.1 | 3.3 |
| Cl. butyricum C-54 | 6.9×10⁶ | 3.0 | 2.1 |
| Cl. butyricum C-54 | 0.69×10⁶ | 3.0 | 2.6 |
| Cl. butyricum C-91 | 100×10⁶ | 3.3 | 2.2 |
| Cl. butyricum C-91 | 10×10⁶ | 2.3 | 3.4 |
| Cl. butyricum C-91 | 1×10⁶ | 2.8 | 2.5 |
| Saline Controls | | 4.7 | 6.6 |

In a further test conducted in the same manner the spores of Clostridium pectinovorum prepared by growing this microorganism in a trypticase soy medium were also shown to have a lytic effect on sarcoma 180 in mice.

The results of these tests are shown in the following table:

| Treatment | Spores given i.v., based on viable count | Average tumor weights in grams after— | |
|---|---|---|---|
| | | 10 days | 13 days |
| Cl. pectinovorum | 8×10⁶ | 1.6 | 2.15 |
| Cl. pectinovorum | 16×10⁵ | 1.8 | 2.55 |
| Saline controls | | 2.9 | 4.8 |

What is claimed is:

1. A composition for the treatment of tumors in animals that comprises a suspension of an effective amount of spores of a non-pathogenic anaerobic strain of Clostridium butyricum ATCC 13732 intimately dispersed in a physiological carrier vehicle.

2. The composition of claim 1 wherein there is also included in the suspension a physiologically tolerable amount of a bacterial endotoxin of a gram-negative bacteria.

3. A method for the treatment of animals suffering from tumors that comprises administering parenterally to said animals an effective but non-toxic amount of spores of a non-pathogenic anaerobic strain of Clostridia intimately dispersed in a physiological carrier vehicle.

4. The method of claim 3 wherein the spore composition also contains a physiologically tolerable amount of bacterial endotoxin of a gram-negative bacteria.

5. The method of claim 3 wherein the strain of Clostridia is *Clostridium butyricum* ATTC 13732.

6. The method of claim 3 wherein the strain of Clostridia is *Clostridium acetobutylicum*.

7. The method of claim 3 wherein the strain of Clostridia is *Clostridium tyrobutyricum*.

8. The method of claim 3 wherein the strain of Clostridia is *Clostridium tertium*.

9. The method of claim 3 wherein the strain of Clostridia is *Clostridium felsenium*.

10. The method of claim 3 wherein the strain of Clostridia is *Clostridium pectinovorum*.

References Cited by the Examiner

UNITED STATES PATENTS 2,310,937  2/43  Connell _____ 167—78

FOREIGN PATENTS 466,029  5/37  Great Britain.

OTHER REFERENCES

Breed et al., Bergy's Manual of Determinative Bacteriology, 7th Edition, pub. 1957, pp. 642, 646, 657, 682–685, and 691–692.

Excerpta Medica, Section XVI, vol. 8, Cancer, Jan.–June 1960, pp. 222, abst. 791, citing Z. Krebsforsch, 1959, vol. 63, No. 1, pg. 63–74.

Mose et al., Zeitschrift für Krebsforschung, vol. 36, pp. 63–74, Oct. 6, 1959.

Reilly, Cancer Research, Dec. 1953, pp. 821–834.

JULIAN S. LEVITT, *Primary Examiner*.

MORRIS O. WOLK, FRANK CACCIAPAGLIA, JR.,
*Examiners.*